A. H. BALLAGH.
Riding Attachments for Plows.

No. 145,083. Patented Dec. 2, 1873.

Witnesses:
A. Bennenendorf
Sedgwick

Inventor:
A. H. Ballagh
Per Munn & Co.
Attorneys.

UNITED STATES PATENT OFFICE.

ANDREW H. BALLAGH, OF BOWENSBURG, ASSIGNOR TO HIMSELF AND MARTIN McNITT, OF MOUND STATION, ILLINOIS.

IMPROVEMENT IN RIDING ATTACHMENTS FOR PLOWS.

Specification forming part of Letters Patent No. 145,083, dated December 2, 1873; application filed June 21, 1873.

*To all whom it may concern:*

Figure 1:
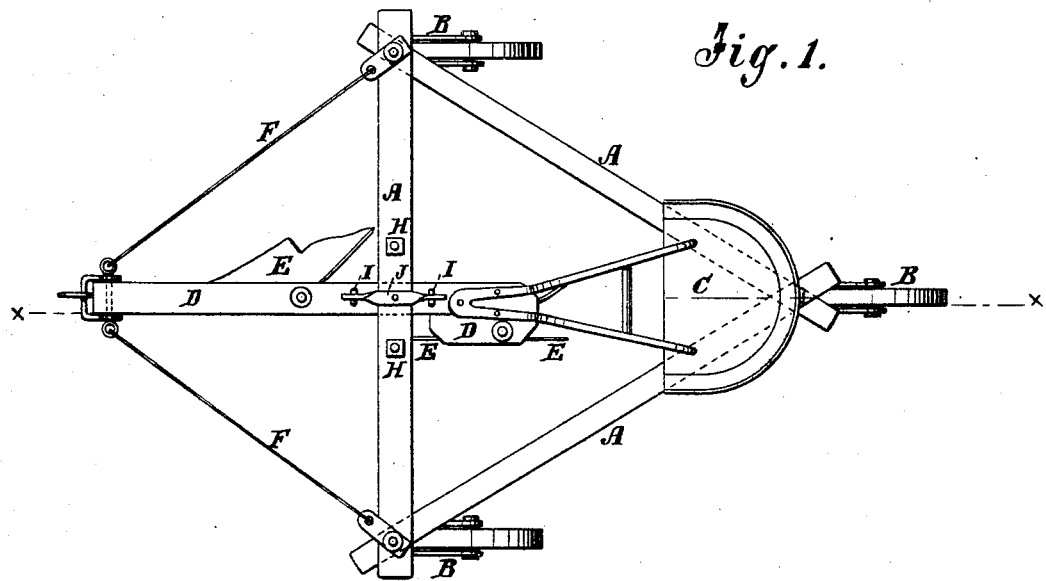
Figure 2:
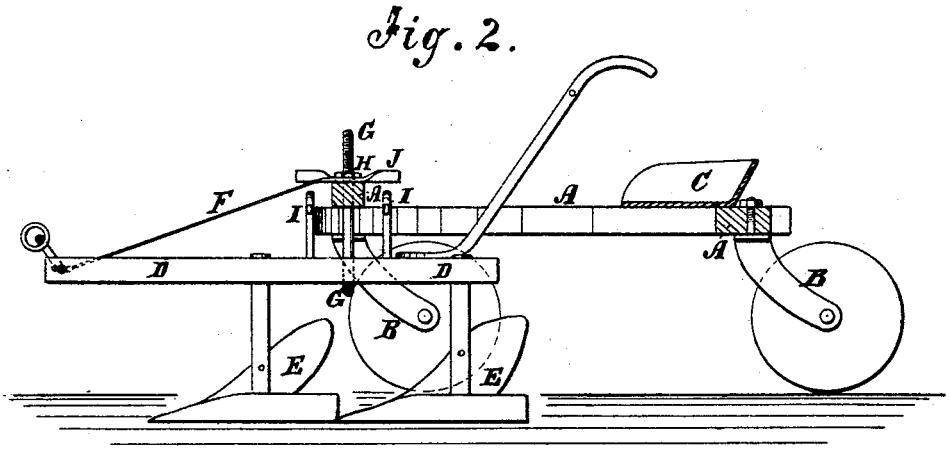

Be it known that I, ANDREW H. BALLAGH, of Bowensburg, in the county of Hancock and State of Illinois, have invented a new and useful Improvement in Riding Attachment for Plows, Harrows, Rollers, &c., of which the following is a specification:

Figure 1 is a top view of my improved attachment shown as applied to a plow. Fig. 2 is a vertical longitudinal section of the same, taken through the line $x\ x$, Fig. 1.

Similar letters of reference indicate corresponding parts.

My invention is an improvement in riding-plows; and consists in an arrangement of plow-beam with a triangular frame, supported on caster-wheels, the parts being so connected that the same rods which serve to brace or hold the plow-beam in proper position serve also as draft-rods for the triangular frame, as hereinafter described.

A represents a triangular frame, to each angle of which is pivoted a caster-wheel, B. The frame A is placed with one side at right angles with the line of draft, and to its rear angle is attached the driver's seat C, which may be stationary or adjustable, as may be desired. D is the plow-beam, to which one, two, or more plows, E, are attached, and to the forward end of which the draft is applied, in the ordinary manner. To the forward end of the plow-beam D are attached the forward ends of two rods, F, the other or rear ends of which are attached to the ends of the front bar of the frame A. The frame A and its attachments are thus drawn from the forward part of the plow-beam D, which leaves the plow or plows to operate freely and unimpeded by the attachment. The rear part of the plow-beam D passes through a stirrup or bow, G, the arms of which pass up through the bar of the frame A, and are held in place by nuts H, screwed upon them upon the upper side of the bar of the frame A, so that by turning the said nuts H up or down the plow or plows may be adjusted to work deeper or shallower in the ground. By this arrangement the downward pressure upon the bottom of the furrow, and the friction upon the bottom and land-side of the plow, will be very greatly lessened. I are two hook-bolts, which are screwed into the plow-beam D in such positions that one may project in front and one in the rear of the front bar of the frame A, so as to be hooked upon the cross-bar J, attached to the said front bar of the frame A, to support the plow away from the ground when turning, or when passing from place to place.

Having thus described my invention, I claim as new and desire to secure by Letters Patent—

The triangular frame A, caster-wheel B, beam D, and draft-rod F, combined in a riding-plow, as and for the purpose described.

ANDREW H. BALLAGH.

Witnesses:
GEORGE BASHENS,
JONATHAN TARR.